(12) United States Patent
Prucher

(10) Patent No.: US 10,730,135 B2
(45) Date of Patent: Aug. 4, 2020

(54) WELDING ELECTRODES AND ADAPTER THEREFOR

(71) Applicant: Bryan Prucher, Clarkston, MI (US)

(72) Inventor: Bryan Prucher, Clarkston, MI (US)

(*) Notice: Subject to any disclaimer, the term of this patent is extended or adjusted under 35 U.S.C. 154(b) by 335 days.

(21) Appl. No.: 14/718,255

(22) Filed: May 21, 2015

(65) Prior Publication Data
US 2015/0336199 A1    Nov. 26, 2015

Related U.S. Application Data

(60) Provisional application No. 62/002,314, filed on May 23, 2014, provisional application No. 62/004,562, filed on May 29, 2014.

(51) Int. Cl.
*B23K 11/30* (2006.01)
*B23K 11/31* (2006.01)

(52) U.S. Cl.
CPC .......... *B23K 11/30* (2013.01); *B23K 11/3054* (2013.01); *B23K 11/3063* (2013.01); *B23K 11/31* (2013.01)

(58) Field of Classification Search
CPC ..... B23K 11/30; B23K 11/31; B23K 11/3054; B23K 11/3063; B23K 11/3009; B23K 11/3072; G05B 2219/45135
USPC ........ 219/119, 80, 84, 86.32, 86.1, 86.8, 88, 219/117.1, 118, 120, 91.2
See application file for complete search history.

(56) References Cited

U.S. PATENT DOCUMENTS

| | | | | |
|---|---|---|---|---|
| 4,476,372 A * | 10/1984 | Prucher | .............. | B23K 35/0205 219/119 |
| 4,728,765 A * | 3/1988 | Prucher | .............. | B23K 35/0205 219/119 |
| 4,728,769 A * | 3/1988 | Nishiwaki | .......... | B23K 35/0205 219/119 |
| 4,760,235 A * | 7/1988 | Flater | ................. | B23K 35/0205 219/119 |
| 5,041,711 A * | 8/1991 | Prucher | .............. | B23K 11/3018 219/119 |
| 5,155,320 A * | 10/1992 | Simmons | ........... | B23K 35/0205 219/119 |
| 5,200,594 A * | 4/1993 | Okada | ...................... | H05H 1/34 219/119 |
| 5,349,153 A * | 9/1994 | Prucher | .............. | B23K 35/0205 219/117.1 |
| 6,355,901 B1 * | 3/2002 | Nippert | .............. | B23K 11/3018 219/119 |
| 7,022,934 B1 * | 4/2006 | Pratt | .................... | B23K 11/314 219/119 |
| 8,299,388 B2 * | 10/2012 | Fleckenstein | ...... | B23K 11/3018 219/85.16 |
| 2009/0218323 A1 * | 9/2009 | Abe | ................... | B23K 11/3009 219/86.25 |

* cited by examiner

*Primary Examiner* — Dana Ross
*Assistant Examiner* — Joe E Mills, Jr.
(74) *Attorney, Agent, or Firm* — The Weintraub Group, P.L.C.

(57) ABSTRACT

An electrode cap and adapter assembly includes a cap having a useful life line inscribed thereon. The cap may be either a circumferentially configured internally finned cap or a self-dressing internally finned cap. The male/female adapter is used to mount a female cap to a male shank.

4 Claims, 8 Drawing Sheets

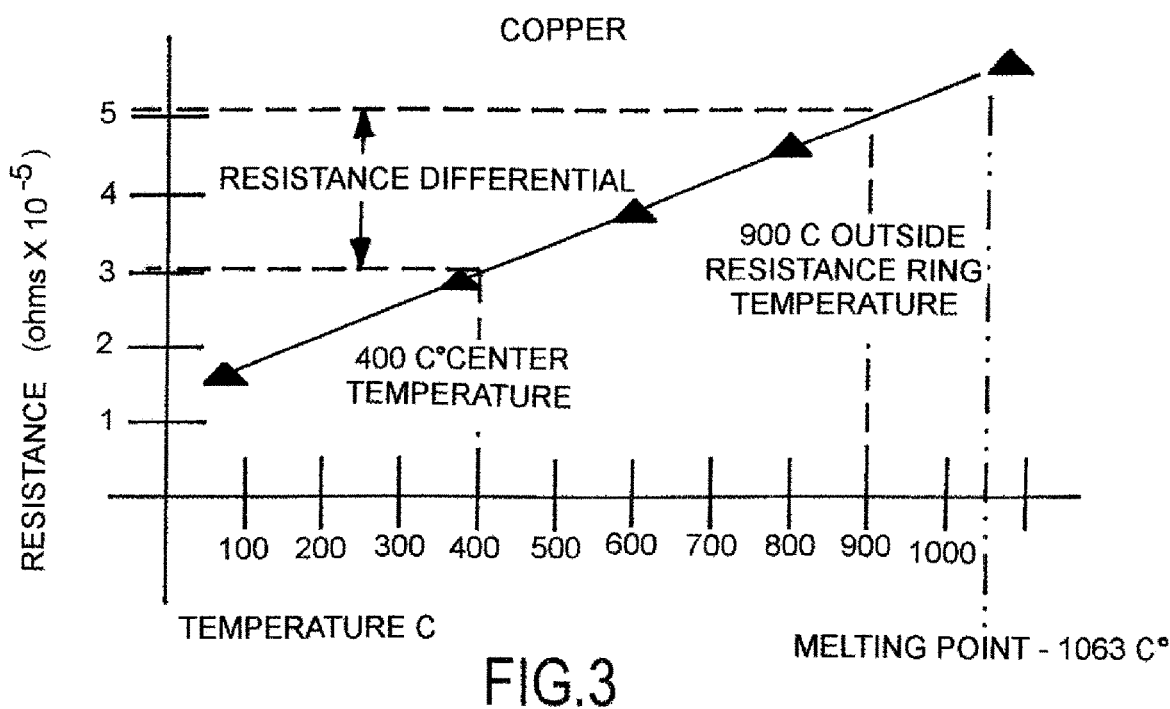
FIG.3
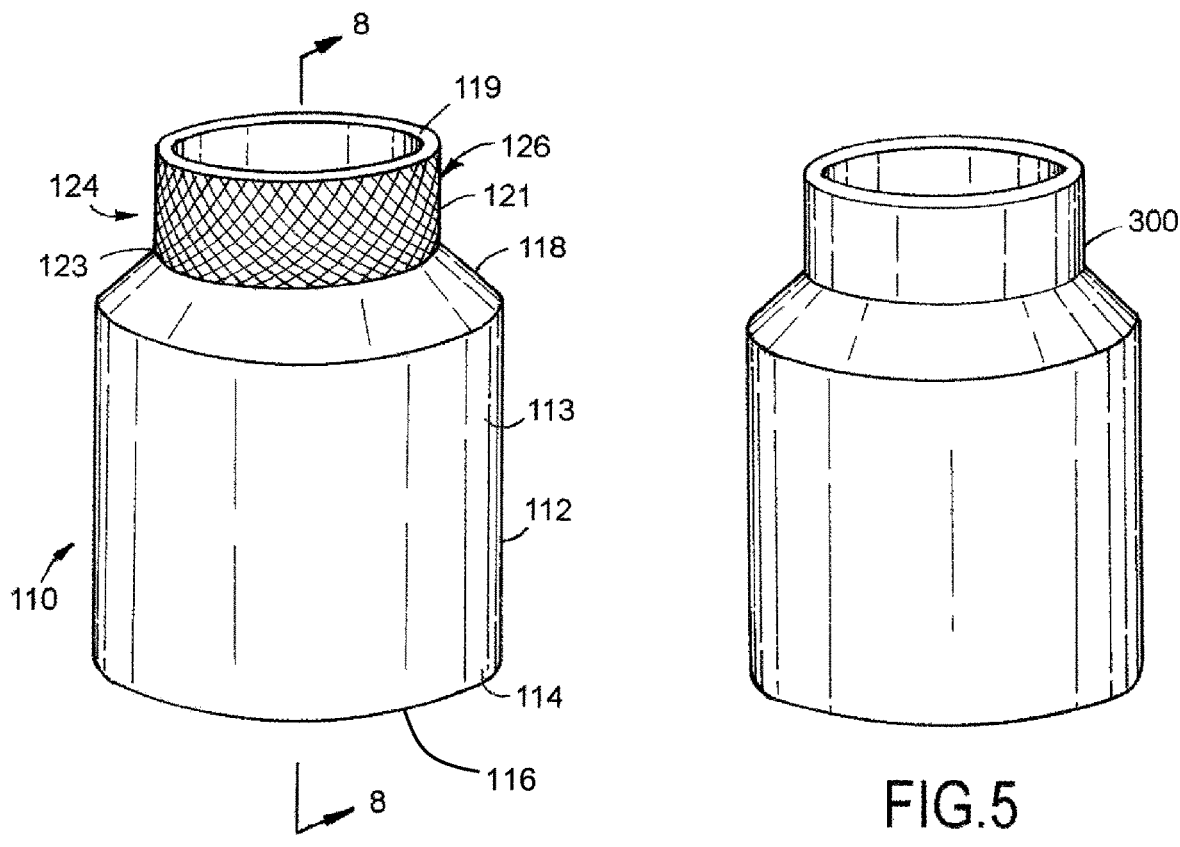
FIG.4
FIG.5

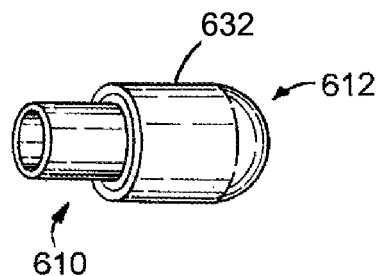
FIG.9
FIG.11
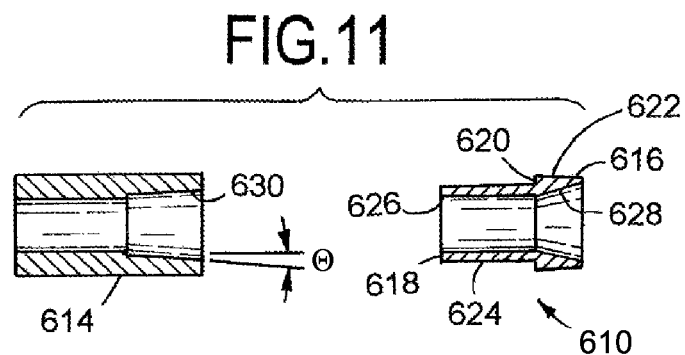
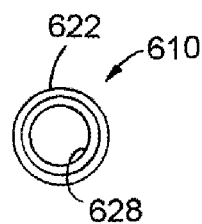
FIG.10

WELDING ELECTRODES AND ADAPTER THEREFOR

CROSS-REFERENCE TO RELATED APPLICATIONS

This is a completion application of U.S. Provisional Patent Application, Ser. Nos. 62/002,314 and 62/004,562 filed May 23, 2014 and May 29, 2014 respectively, the disclosures of which are hereby incorporated by reference in their entirety, as well as related to previous U.S. Provisional Application, Ser. No. 61/895,621, filed Oct. 25, 2013, the disclosure of which is hereby incorporated by reference in its entirety as well.

BACKGROUND OF THE INVENTION

1. Field of Invention

This invention relates, in general, to resistance spot welding equipment and, more specifically to resistance spot welding electrodes with a finned cooling cavity. More particularly, the present invention concerns replaceable welding caps or bodies for resistance spot welding electrodes. Even more particularly, the present invention concerns means and methods for determining the end point for dressing an electrode welding caps, as well as their deployment on an electrode shank.

2. Description of Prior Art

The resistance spot welding process is used extensively throughout the durable goods and metal fabrication industries for joining sheet-metal, including coated metals and aluminum. Resistance spot welding is a process used to join together two or more pieces of metal by electrically inducing localized fusion of the metal. Usually, the two or more pieces of metal are thin sheets. However, the process has been shown to be equally useful for joining thicker sheets of metal and coated sheets of metal, such as zinc coated steel (i.e., galvanized steel) and aluminum coated steel (aluminized steel).

The spot welding process generally involves clamping the metal pieces or work-pieces to be joined together between two axially aligned electrodes and applying high pressure thereto. Then, the two electrodes have a high electrical current passed between them. The electric current passing between the electrodes, likewise, passes through the metal pieces. Any resistance point or location in the path of the current becomes heated. The heat is generated proportionally at each resistance point throughout the circuit in accordance with the formula $Q=I^2R$ (heat=current squared X resistance).

The overall resistance of copper electrodes relative to the metal to be joined is small. A large electrical current is needed to produce a high enough heating effect in the work-piece to produce a weld. Since the resistivity of the copper electrodes is much lower than the metal to be joined, the highest level of heat is generated at the interface of the work-pieces. This process is complex, involving the interaction of electrical, thermal, mechanical, metallurgical, and surface phenomena.

In general, there are two areas in the weld current circuit where the electrical resistance is high enough to generate substantial amounts of heat: (1) the lower of the two being at the interface between the electrodes and the work-piece; and (2) the higher of the two being at the interface between the metal pieces. This is true for all types of resistance spot welding and for all types of metals. As the high current is maintained for a sufficient length of time, localized melting will occur at the interface between the two work-pieces and spread to produce a weld nugget.

During the weld cycle, the electrode pressure is maintained to offset the high internal thermal expansion and, thereby, contain the molten pool of metal at the interface of the work-pieces. This prevents liquid metal expulsion. The electrode pressure also helps to maintain proper electrical and thermal contact until the formation of the weld nugget is completed.

The weld cycle is terminated by switching the current off while maintaining the electrode pressure. The final stage of this process is the hold cycle, which establishes the metallurgical quality of the weld nugget. During the hold cycle, the nugget cools and contracts. Mechanical pressure is essential to provide the necessary forging pressure to obtain a good metallurgical structure and to prevent the formation of shrinkage voids in the nugget. The hold time is important since it establishes the rate of cooling. All of the associated variables (i.e. weld current, weld time, hold time, etc.) are managed and controlled by a programmable weld controller.

There are several factors involved in obtaining an acceptable and quality spot weld, namely, the type of metal to be welded, the type of electrode used, the amount of clamping pressure applied by the electrodes, and the amount and duration of electrical current needed to accomplish the weld. Of all the above factors, the type of electrode employed has the greatest influence. Resistance welding electrodes are typically made from a copper alloy. These copper alloy electrodes, e.g. Ca—Si—Ni, Cu—Zr, Cu—Cd, Cu—Cr—Zr, dispersion strengthened copper (DCS), and the like, serve three essential functions in the welding process: (1) due to their low electrical resistance, they provide a conduit for carrying a high electrical current to a work-piece without significant heating (Joule) losses; (2) their high thermal conductivity provides a method for conducting heat from the work-piece and controlling the cool-down process, thereby promoting the weld nugget formation and, (3) they provide the mechanism for properly locating and clamping the work-pieces together to establish a good interface and good electrical contact before the weld current is applied.

Generally, these electrodes are water cooled, when in use. Water cooling is employed to keep the electrodes cool during the welding process for prolonging their usable or useful life. Water cooling, also, supports the cooling portion of the weld cycle. It also prevents the electrode and work-piece from sticking or welding together.

During welding, the electrode bodies or caps progressively lose their shape. The recurring heat and compression cycles associated with welding result in mechanical fatigue that leads to distortion commonly referred to as "mushrooming". This effect increases the cross-sectional area at the contact surface between the electrode bodies or caps and the work-piece, causing a reduction of the weld current density. Progressively, over successive welds, this increase in cross-sectional area diminishes and ultimately eliminates the ability of the electrodes to produce a weld. To compensate for this, automatic adjustments are programmed into the weld controller to boost the weld current level and its duration up to a maximum point.

When the ability of the weld controller to boost the current has been exhausted, the electrode contact faces are reshaped or dressed to restore their original configuration. This is typically accomplished either manually with a file or hand power tool, or robotically in conjunction with a specialized automated dressing cell. Once the electrode cap has been redressed, the controller schedule is re-set to accommodate the refurbished contact area and permit continued use of the electrode. Electrodes can have their useful life extended by re-dressing the cap multiple times. They cannot, however, be dressed too close to the end of the cooling cavity as that would cause the electrode to catastrophically collapse to the detriment of the welding operation. At this point the electrode caps are considered fully spent and must be replaced The automobile industry employs spot welding, almost exclusively, as the process used for the vehicle body fabrication. Until the advent of the introduction of coated steel as the body fabrication material of choice the problems associated with electrode deformation were easily resolved by stepping up the current and dressing the electrode cap as the need arose. However, coated metals, such as galvanized and/or aluminized steel, used in automobile body manufacturing require higher current levels to produce a weld. This dramatically increases electrode deformation, resulting in a significant reduction in usable electrode life.

With galvanized steel, this accelerated deformation is directly related to the zinc being more electrically conductive than steel. Therefore, the addition of a layer of zinc or any other highly electro-negative coating material to the work-piece surfaces reduces the interface contact resistance. This necessitates a corresponding increase in the electrical current to generate enough heat to produce a weld. The result is higher temperatures at the electrode/work-piece interface. These elevated welding temperatures cause an additional problem when welding coated steels. Because of the higher inter-facial heat, the coating material has a tendency to melt, alloy with, and stick or adhere to the face of the copper-based electrode caps. The resultant coating "picks up" on the electrode cap face and, thereby, increases its electrical resistance, causing further localized heating and accelerated wear as well as a higher incidence of poor quality welds and, in some instances, the caps actually weld themselves to the work-piece.

One of the ways the industry has attempted to resolve this problem is by producing welding electrodes from a specially formulated dispersion strengthened copper (DSC) material. DSC is a class of materials that comprise pure copper with a small quantity, typically from about 0.25% to about 1.5% by weight of the composition, based on the total composition. These materials are produced using a powder metallurgical process. Infusing copper with a small percentage of a ceramic such as $Al_2O_3$ and the like results in increasing the temperature where copper begins to soften from around 600° C. to over 900° C. or almost up to its melting point. This is accomplished without any discernible effect on its electrical conductivity. This attribute alone dramatically extends electrode life, as it increases the ability of electrode caps to tolerate higher levels of current and resist the deformation associated with the higher welding temperatures.

The presence of a ceramic dispersant material has the added advantage of almost completely eliminating the tendency of the steel coating to alloy and/or stick to the electrode surface.

It is generally accepted that the choice of electrode materials has a clear effect on electrode life. However, this does not eliminate the mushrooming and diminished capability of the electrode cap as it is continually dressed.

Since the cooling cavity associated with these resistance spot welding electrode caps is not externally visible, it is not possible to ascertain the location of the cavity to determine the optimal point to which the cap can be dressed to attain maximum electrode life. Less than optimal dressing results in an opportunity loss, as it does not take advantage of the full potential usable life of the electrode cap. In contrast, dressing past this point will result in catastrophic electrode failure.

As discussed below, the present invention addresses this issue, while concomitantly preventing the electrode from being ruined by being dressed beyond the cooling cavity.

SUMMARY OF THE INVENTION

In one aspect, the present invention provides means for demarking an electrode body or caps at its maximum useful life with a "maximum life line marker". The maximum life line marker provides the welding operator with a readily visible line, or other suitable marking or other indicia, on the exterior body of the electrode cap as a guide or indicator as to where dressing must cease in order to obtain maximum electrode life.

This maximum life line marker is particularly adapted for use with resistance welding electrodes having an internal finned cooling cavity of the type described in U.S. Pat. Nos. 4,476,372, 4,728,765, 4,760,235, 5,041,711, 5,349,153, and 8,299,388, the disclosures of which are hereby incorporated by reference in their entirety.

These electrode cooling cavities, aside from their unique finned configuration, are much deeper, extending closer to the working end face of the electrode than conventional electrode cavities. This is made possible by the augmented structural support provided by the fins integrally formed on the inside surface. The resulting internal increased surface area enhances cooling, giving rise to extended electrode life and increased energy efficiency. In another aspect hereof, there is provided a self-dressing electrode cap that when operating in a welding application has an increased resistance about the perimeter or outer ring with lower resistance in its center. In a still further aspect hereof, there is provided a male/female electrode adapter which may be used with the electrode caps hereof.

For a more complete understanding of the present invention, reference is made to the following detailed description and accompanying drawing. In the drawing, like reference characters refer to like parts throughout the several views, in which:

BRIEF DESCRIPTION OF THE DRAWING

FIG. 3 is a graph showing the temperature differential between the perimeter or outer ring and the center of a self-dressing copper electrode tip;

FIG. 4 is a side view of a first embodiment of an improved self-dressing electrode in accordance herewith;

FIG. 5 is a side view of an alternate embodiment of the self-dressing electrode;

FIG. 9 is an end view of a first embodiment of a male/female electrode cap adapter in accordance herewith;

FIG. 10 is an end view of the adapter hereof;

FIG. 11 is an exploded, cross-sectional view of an electrode shank and the adapter hereof;

DESCRIPTION OF THE INVENTION

Throughout the ensuing description, the terms "electrode", "electrode body" or "electrode cap" are used interchangeably to reference the replaceable portion of a welding robot.

Figure 1:
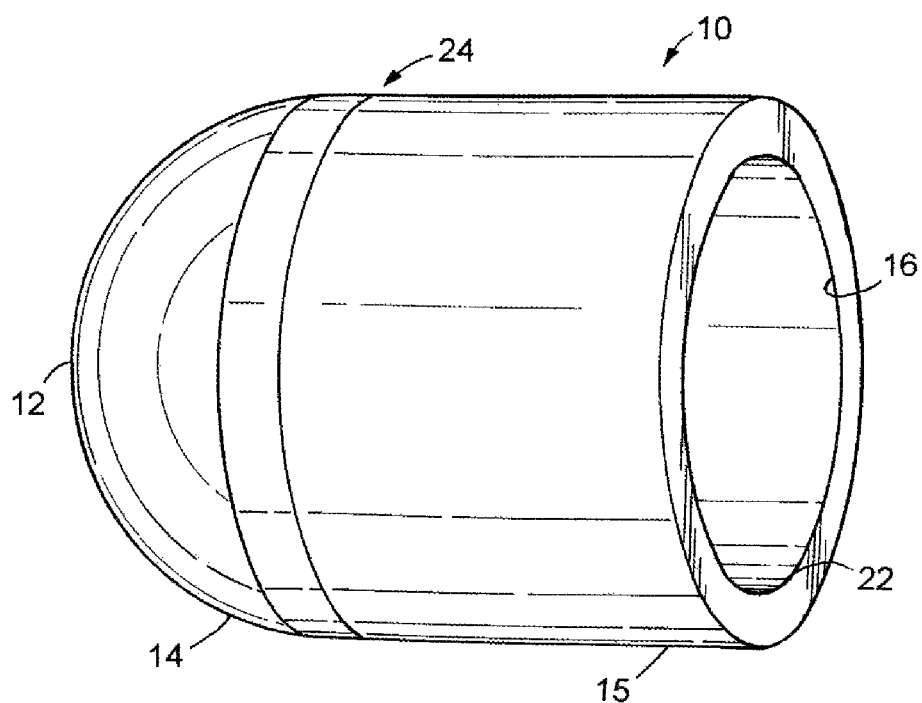
FIG. 1 is a perspective of a finned electrode cap having a maximum life line marker in accordance with the present invention.
Figure 2:
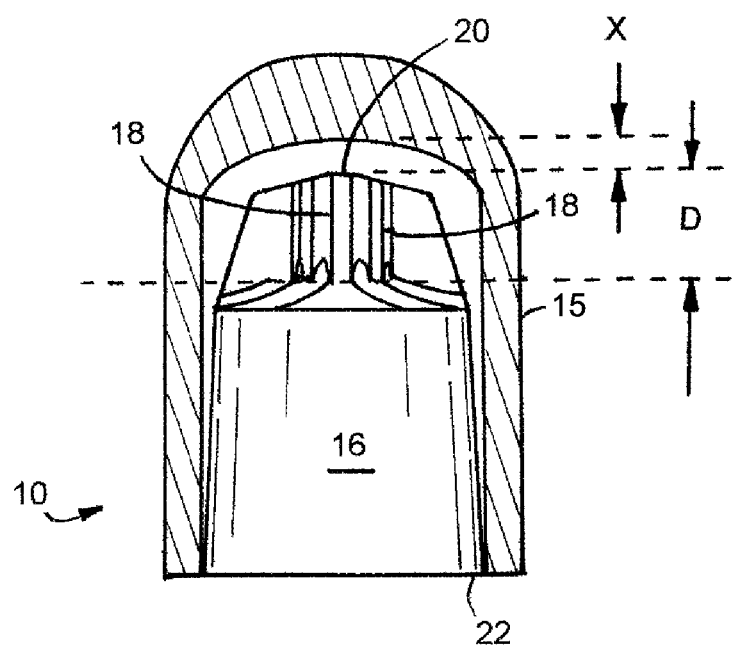
FIG. 2 is a cross-sectional view of an electrode cap depicting the distance between the internal cooling cavity end point and the maximum life line marker.

Now and with reference to the drawing, and in particular FIGS. 1 and 2, there is depicted therein an electrode body or cap 10. As shown, the body or cap 10 has an exterior planar upper surface or top 12 and an integrally formed arcuate or curvilinear circumferential shoulder 14 which merges into a cylindrical sidewall 15.

An entry 22 is provided at the end of cap opposite the top 12. The electrode or electrode body or electrode cap 10 has an internal, finned cooling cavity 16 (FIG. 2), the walls or surfaces thereof are substantially parallel to the exterior surfaces or walls and are tapered to frictionally fit onto a shank. The internal cavity 16 has a distal end point 20 which is substantially parallel to the top or spot 12 and the opposed proximal end or entrance 22.

A plurality of fins 18 are circumferentially disposed about the cooling cavity 16 in the manner, as disclosed and described in the above-referred to U.S. Patents.

A "maximum life line" marker or other indicia 24 is disposed on the exterior of the sidewall 15 at a location proximate the distal end point. The marker 24 defines the position where the last dressing operation is to terminate in order to achieve maximum electrode life.

This "maximum life line" marker 24 is positioned at the point past which only a specific number of welds, as specified by the manufacturer, can be safely made. After this specified number of welds the electrode 10 is considered spent.

This "maximum life line" marker 24 can comprise a circumferential line, as shown, or other suitable marking or other readily visible indicia. The marker 24 is strategically positioned with respect to the location of the internal finned cooling cavity 16 relative to the end point 20 by a distance D.

As is known to those skilled in the art, there are a number of different welding alloys such as those identified above. These different welding alloys possess their own unique temperature dependent physical properties. Among these is the temperature at which any particular alloy begins to soften and lose its resistance to deformation under a compressive load. Since the softening temperature of these various welding alloys differs, to attain maximum life, it is essential to determine the distance between the inner cavity end 20 and the nose 12 of the electrode after it has received its last dressing. This is shown in the drawing as distance "X".

Because of the alloy-dependent varying characteristics the amount of material remaining between the internal cavity and the outer working surface of the electrode must also vary accordingly.

Accommodating the temperature dependent characteristic while achieving maximum life, can be achieved in either one of two ways.

1. The position of the maximum life line marker 24 can be fixed proximate the distal end or entrance 22 into the internal cavity 16 and the distance "X" varied as a function of the unique temperature dependent properties by varying the cavity depth.
2. Alternatively, the distance "X" can remain constant and the position of the maximum life line marker 24 can be varied proximate the distal end or entrance 22 into the internal cavity 16 as a function of the unique temperature dependent properties.

A finned cavity resistance spot welding electrode is typically manufactured by a cold forming process in a cold-heading machine. This is a multi-staged cold forging machine that produces a finished product from a raw stock material by moving it through a series of progressive forging operations usually, 5 or 6. The raw material used to manufacture electrodes is round stock, which is fed into the machine and, ordinarily, supplied as an extrusion in either straight rod or coil form. If it has been determined that the maximum life line marker 24 is to remain fixed proximate the distal end or entrance 22 into the internal cavity 16, it can be imparted on the electrode body 10 in the die cavity during any one of the last two or three forming stages. In this case, the distance "X" will be modified as a function of the alloy material's physical properties by a simple adjustment to the punch that forms the cooling cavity 16 in the final stage.

Alternatively, the marker 24 can be machined, etched, or laser printed on the electrode body 10 in a secondary post forming operation.

If the distance "X" is determined to remain constant, the position of the maximum life line 24 can be varied proximate the distal end or entrance 22 into the internal cavity 16, by providing a unique line imparting die cavity for each line position requirement. This unique line can be machined, etched or laser printed on the electrode body in a secondary post forming operation.

In either scenario as outlined above, a demarcation is provided which prevents damage to the electrode while maximizing the useful life of the electrode cap 10. It is to be appreciated that the maximum life line marker 24, past which only a manufacturer's recommended specified number of welds are to be made, provides an efficient and effective way for maximizing electrode life, while preventing subsequent weld failure, production disruption, and/or possible damage to the associated welding equipment.

In another aspect of the present invention and although the ensuing description will be made with respect to a finned electrode cap, it is to be understood that both finned and non-finned, nonferrous electrodes, including self-dressing electrodes, are within the scope hereof. As noted above, finned electrodes or electrode tips or caps are those whose internal cavities have a plurality of radial fins.

It is to be further understood that the nonferrous materials typically used in these electrodes include, for example, copper, dispersion strength and copper alloy, Cu—Si—Ni alloys, Cu—Cd alloys, Cu—Zr alloys, Cu—Cr—Zr alloys, dispersion strengthened copper (DSC), and the like.

Figure 8:
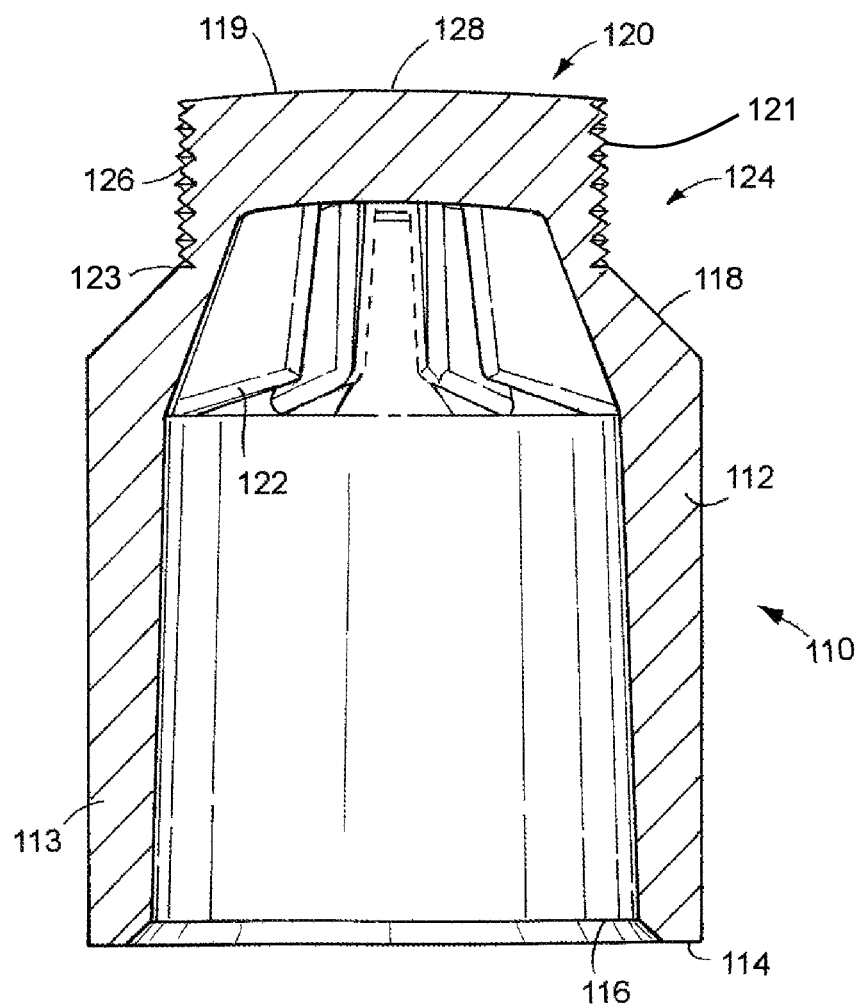
FIG. 8 is a cross-sectional view taken along line 8-8 of FIG. 4.
Figure 12:
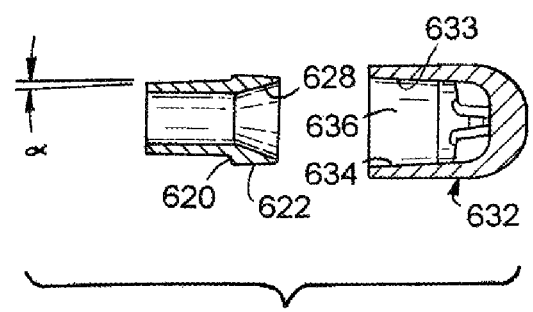
FIG. 12 is an exploded, cross-sectional view of the adapter in relative assembly relation to a finned female resistance welding electrode cap.

Now, and with reference to the drawing and in particular FIGS. 4 and 8, there is depicted therein an exemplary electrode tip or cap, generally, denoted at 110 in accordance with the present invention and which increases the resistance about the outer ring thereof while maintaining a cooler lower resistance center.

Generally, the typical self-dressing, finned electrode tip or cap 110 comprises a substantially cylindrical body 112 having a sidewall 113 and a first end 114. The first end 114 defines an entryway 116 into which an electrode or electrode shank (not shown) is inserted. Optimally, the electrode cap 110 is a female electrode cap which removably receives the electrode.

The cap 119 has a spot or top 120, which is integral with and extends upwardly from a shoulder 118. As shown, the top 120 comprises an outer ring or sidewall 121 and a central portion or core 128.

The junction or intersection 123 between the shoulder 118 and the sidewall outer ring 121 defines the maximum life line.

According to this embodiment, the electrode cap includes a plurality of internally formed fins 122. As disclosed in the above referred to patents the fins 122 provide a cooling surface to augment that normally associated with the internal surfaces of the electrode.

In accordance with the one embodiment, the present electrode further comprises means, generally, denoted at 124 for increasing the resistivity of the electrode cap 110. The means 124 comprises a radically roughened or in this case a knurled surface 126. The surface 126 is circumferentially formed on and disposed about the sidewall 121 of the electrode cap and extends from the junction 123 between the shoulder 118 and the top 120. The knurled surface 126 can be formed by any suitable means such as, for example, during the extrusion process, by cold-forming the tip, by radially knurling to produce asperities, or the like.

In operation, the outer surface of the sidewall 121 of the cap 110, the resistivity about the perimeter of the top surface 120 of the cap 110 is increased. This knurling increases the temperature at the outer ring portion 121 while enabling the central bulk portion 128 of the top surface 120 to be at a lower temperature than that of the sidewall 121 and outer ring 121. This difference in resistivity encapsulates and concentrates the current path at the center of the tip. This concentration or "tunneling" of the current path focuses the weld energy in the center resulting in an overall reduction in the energy required to produce a weld and further enables the formation of a better weld nugget during use.

It is possible that the knurled layer can be formed from one material, e.g. DSC and the electrode cap from a different material, e.g. copper, thus, providing a variation in the resistivity of the material used to form the electrode and that used to form the knurling.

Where different materials are used the means 124 is secured to the electrode cap 110 by, for example, a powder metallurgical process.

The knurling along the sidewall 121 creates discontinuities about the sidewall 121 and, a hotter temperature at the outer edge or perimeter of cap 110, than is normally encountered.

Figure 6:
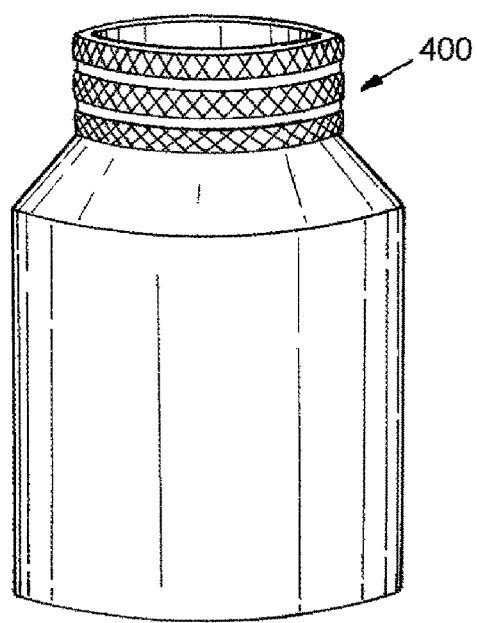
FIG. 6 is a side view of a third embodiment of the self-dressing electrode.
Figure 7:
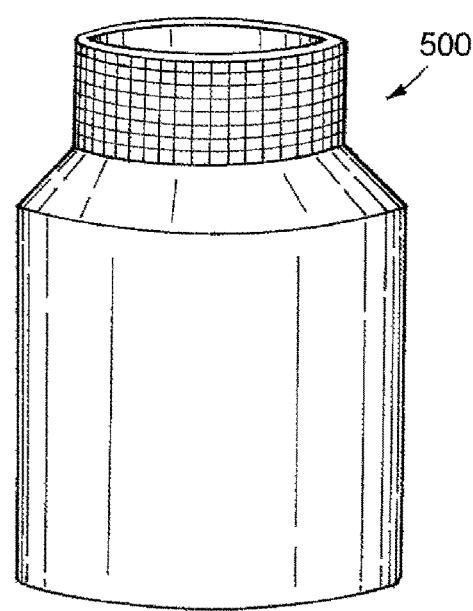
FIG. 7 is a side view of a fourth embodiment of the self-dressing electrode.

In FIGS. 5-7 there is depicted various forms of asperities which can be used to create the requisite discontinuities along the sidewall of the top to increase the resistivity thereof.

In FIG. 5 the asperities form a net-like structure 300 having the requisite peaks and valleys.

In FIG. 6 the asperities 400 comprise a multi-layered knurled surface. This can be achieved by machining the exterior of the sidewall and providing equidistantly formed grooves about the periphery of the sidewall to provide further discontinuity and to provide multilayers.

Still another useful configuration includes scored cubes such as shown in FIG. 7 at 500.

In any event, the purpose of the discontinuities or asperities is to provide in operation greater resistance about the periphery of the tip of the top.

It is believed that it is possible to achieve consistent welds at significantly lower levels of energy with the present electrode caps because of the current "tunneling" effect achieved by the increase in resistance achieved through these discontinuities at the sidewall.

Although the drawing depicts the self-dressing electrode cap as having a toroidal shoulder 118 and a substantially circular top 120, it is to be understood that any other useful shoulder 118 configuration such as a "bullet shape" or the like may be used.

Now, and in a still further aspect of the invention, with reference to the drawing and, in particular, FIGS. 10-13, there is shown a first embodiment of a male/female electrode adapter 610 adapted to be fitted at a first end thereof to a female finned electrode cap 632 and to a female electrode shank 614 at the opposite end thereof. The adapter 610 has a front end 616, and a rear end 618. The adapter 610 has a shoulder or junction 620 circumferentially disposed around the exterior surface of the adapter 610. Thus, the adapter 610 has a first external tapered diameter front section 622 and an external reduced tapered diameter second or rear section 624. The front section 622 tapers inwardly from the shoulder 622 to the front end 616 of the front section 622.

Similarly, the rear section 624 tapers inwardly from the shoulder 620 to the rear end 618 of the rear section 624 by an angle α.

The adapter 610 has a throughhole or throughbore 626 passing entirely through the adapter 610 along its centerline.

As shown, the throughbore 626 is substantially cylindrical from the rear end 618 to the plane of the junction or shoulder 620. An internal radial outwardly extending taper 628 extends from the plane passing through the shoulder 620 to the front end 616.

The second or rear section 624 of the adapter 610 defines the male extension portion that fits into a male shank 614.

The female shank 614 has an entry 630. The entry 630 has a taper angle Θ.

The taper angle α of the external surface of the rear section 624 matches the taper angle Θ of the entry 630 in the female electrode shank 614. However, the diameter of the entry 630 of the female electrode shank 614 ranges from about 85% to about 95% and, preferably, about 90% of the difference between the largest and smallest diameters of the adapter to limit the depth of insertion thereinto.

Thus, when the adapter 610 is fitted in place into the electrode female shank 614, it is secured by frictional forces. Because it has a larger diameter taper than the tapered entry in the female electrode shank 614, when the rear section 624 is properly positioned it sits slightly outboard from the female electrode shank 614.

Figure 13:
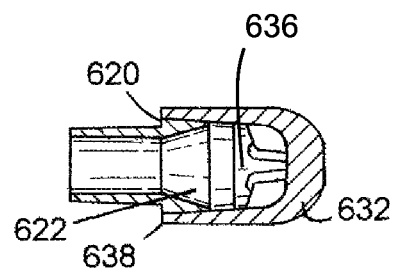
FIG. 13 is a cross-sectional view of the first embodiment hereof assembled to a finned female resistance welding electrode cap.
Figure 14:
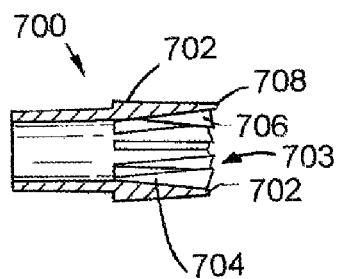
FIG. 14 is a cross-sectional view of a second embodiment of an male/female electrode cap adapter in accordance herewith.
Figure 15:
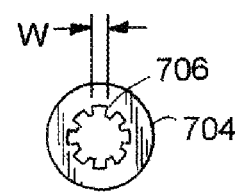
FIG. 15 is an end view of the adapter hereof.
Figure 16:
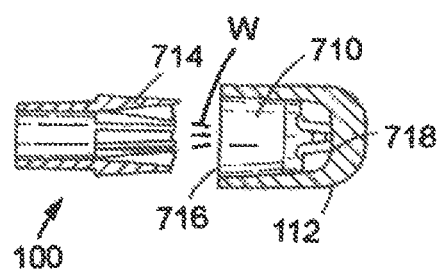
FIG. 16 is an exploded, cross-sectional of the second embodiment positioned in relative assembly relation to a finned female resistance welding electrode cap.

As shown in FIG. 13, the external taper accorded the front section 622 corresponds to the inside or internal taper 633 of a finned cooling cavity 636 of a female electrode or electrode cap 632. Preferably, the external diameter of the front section 622 is from about 0.001" to about 0.002" larger than the female electrode taper diameter 634.

As shown in FIG. 13, when assembled, the male/female adapter is press fitted into the cavity 636 of the female electrode cap 632 so that the shoulder 620 of the male/female adapter is flush with the external rear surface 638 of the female electrode cap 632.

The first section 622 has a length between about 30% and about 60% of the dimensional depth of the female electrode cooling cavity 636.

As the diametric dimensional difference provides an interference fit between the two components, the assembly is held together by frictional forces. If deemed necessary, additional structural security can be provided by bonding the two components together using a process such as staking, friction stir welding spin welding, e-beam welding, laser welding or the like.

Referring now to FIGS. 14-17 there is shown a second embodiment of the present adapter, generally, denoted at 700. This embodiment differs from the first embodiment in that the forward section 702 of the adapter has a plurality of fins 706 formed within the internally flared or tapered section 704.

A tab 708 extends from about 0.02" to about 0.04" past an entry 703 of the forward section 702. The tab 708 is integrally formed with the body of the adapter 700 and is disposed at the face of the entry 703 and extends outwardly therefrom.

The width W of the tab 708 is substantially equal to but slightly less than the space between two adjacent fins within a cooling cavity 710 of a female electrode cap 712, and, preferably, an internally finned electrode cap 712. The cap, as shown, has a plurality of circumferentially disposed fins 718 integrally formed with the internal cavity 710.

The fins 718 are equal in number to the fins in the female electrode cooling cavity 710. The rear end dimensions of this second embodiment are the same as the first embodiment.

The front section taper 714 of the adapter 700 fits into the internal cavity 710 of the female electrode or electrode cap 712 and is the same as the first embodiment. The front section 704 is longer in order to match the depth of the cooling cavity 710 from the entry 716 into the cavity 710 to the terminus fins 718 thereof.

Figure 17:
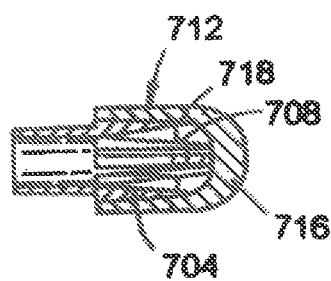
FIG. 17 is a cross-sectional view of the second embodiment of the adapter assembled to a finned female resistance welding electrode cap.

FIG. 17 shows the assembly where the tab 708 is nested between two adjacent cooling fins 718 in the female electrode cooling cavity to cause the fins of the adapter to become aligned and interdigitate with the fins 718 of the electrode 712.

As in the first embodiment, when assembled, the male/female adapter is pressed into the female electrode so that the shoulder 720 is flush with the entry 716 of the female electrode cap 712.

Similarly, the diametric dimensional difference results in an interference fit between the two components, the assembly is held together by frictional forces.

If deemed necessary, additional structural security can be provided by bonding the two components together using a process such as staking, friction stir welding, e-beam welding, laser welding and the like.

There are a number of different electrode cap sizes, shapes and taper dimensions in use worldwide. Although there are efforts within the industry to establish worldwide electrode cap and shank taper standards, the fact remains that there are both technical and business reasons for a large variation. There are a number of SDO's (Standards Development Organizations) throughout the world involved in establishing dimensional standards for resistance welding electrode caps. The most relevant and economically important are those standards most broadly accepted and, therefore, applicable to the largest electrode cap volumes. Preferably the taper dimensions of the present invention conform to those electrode cap standards developed by the American Welding Society (AWS), the International Organization for Standardization (ISO), and the Resistance Welder Manufacturers' Association (RWMA). They can be found in the following standards documents: AWS D8.6:2005; ISO 1089:1980; ISO 5821:2009; ISO 5830:1984; and RWMA Bulletin 16 all of which are well known and readily accessible to those familiar within the industry.

As can be seen from the above, there has been described herein an improved electrode cap having a defined maximum life as well as improved characteristics when having a self-dressing electrode. In addition, the electrode cap(s) hereof are complemented by the male/female adapter.

Having thus, described the invention, what is claimed is:

1. An electrode assembly having a maximum useful end point, comprising:
   (a) an internally finned electrode cap having an internally tapered cooling cavity, the electrode cap including a sidewall, a nose, and the sidewall including an external circumferential line of demarcation, the line of demarcation defining a maximum useful life of the electrode cap, the line being positioned with respect to the internal cavity relative to a useful end point by a predetermined mixed distance, the position of the line being determined by either: (1) being fixed proximate the entrance into the internal cavity by a distance "X", "X" being varied as a function of the unique temperature dependent properties of the cap by varying the cavity depth; or (2) the distance "X" being constant and the position of the maximum life line being varied proximate the entrance into the internal cavity as a function of the unique temperature dependent properties of the cap;
   (b) an electrode adapter, the adapter having a first male end adapted to be frictionally fitted within a female electrode shank and a second male end having an external taper corresponding to the internal taper of the internal cavity of the electrode cap, the external taper of the second end having a diameter larger than the diameter of the internal cavity of the electrode cap, to enable the second end of the adapter to be force fitted into the internal cavity of the electrode cap.

2. The assembly of claim 1 wherein the electrode cap is a self-dressing electrode cap.

3. The assembly of claim 2 wherein the sidewall of the electrode cap is cylindrical, the electrode cap having discontinuities formed about the entirety of the sidewall.

4. An electrode cap assembly having a maximum useful end point, comprising:
   an internally finned electrode cap having an internally tapered cooling cavity formed therein, the electrode cap including a sidewall, a nose, and an internally tapered cavity formed therein, the sidewall including an external circumferential line of demarcation, the line of demarcation defining a maximum useful life of the electrode cap, the line being positioned with respect to the internal cavity relative to the useful end point by a predetermined mixed distance, the position of the line being determined by either: (1) being fixed proximate the entrance into the internal cavity by a distance "X", "X" being varied as a function of the unique temperature dependent properties of the cap by varying the cavity depth; or (2) the distance "X" being constant and the position of the maximum life line being varied proximate the distal entrance into the internal cavity as a function of the unique temperature dependent properties of the cap.

\* \* \* \* \*